US010095450B2

(12) United States Patent
Yokoyama

(10) Patent No.: US 10,095,450 B2
(45) Date of Patent: Oct. 9, 2018

(54) INFORMATION PROCESSING APPARATUS FOR SELECTING ONE OF COMMUNICATION DEVICE CAPABLE OF COMMUNICATING IN FIRST COMMUNICATION METHOD AND COMMUNICATION DEVICE CAPABLE OF COMMUNICATING IN SECOND COMMUNICATION METHOD, CONTROL METHOD FOR CONTROLLING THE INFORMATION PROCESSING APPARATUS, AND NON-TRANSITORY COMPUTER READABLE MEDIUM STORING COMPUTER EXECUTABLE INSTRUCTIONS FOR CAUSING THE INFORMATION PROCESSING APPARATUS TO EXECUTE THE METHOD

(71) Applicant: CANON KABUSHIKI KAISHA, Tokyo (JP)

(72) Inventor: Toshihiro Yokoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/187,306

(22) Filed: Jun. 20, 2016

(65) Prior Publication Data
US 2016/0378411 A1 Dec. 29, 2016

(30) Foreign Application Priority Data

Jun. 23, 2015 (JP) ................................. 2015-125884

(51) Int. Cl.
*G06F 3/12* (2006.01)
*H04W 8/00* (2009.01)
(Continued)

(52) U.S. Cl.
CPC .......... *G06F 3/1236* (2013.01); *G06F 3/1203* (2013.01); *G06F 3/1292* (2013.01);
(Continued)

(58) Field of Classification Search
None
See application file for complete search history.

(56) References Cited

U.S. PATENT DOCUMENTS

2012/0076117 A1* 3/2012 Montemurro ......... H04W 48/16
370/338
2013/0148162 A1* 6/2013 Park ...................... G06F 3/1296
358/1.15

(Continued)

FOREIGN PATENT DOCUMENTS

JP        2014-11671 A    1/2014

*Primary Examiner* — Lennin Rodriguezgonzale
(74) *Attorney, Agent, or Firm* — Canon U.S.A., Inc. IP Division

(57) ABSTRACT

An information processing apparatus includes a first search unit that searches for a communication device communicating in a first communication method while acquiring capability information of the communication device, a second search that searches for a communication device communicating in a second communication method different from the first communication method without acquiring at least some of the capability information acquired by the first search unit, a selecting unit that selects a communication device, and a registration unit that registers the selected communication device as a communication device to communicate with the information processing apparatus.

19 Claims, 10 Drawing Sheets

(51) Int. Cl.
*H04L 29/06* (2006.01)
*H04W 4/00* (2018.01)
*H04W 8/24* (2009.01)
*H04W 84/18* (2009.01)

(52) U.S. Cl.
CPC ......... *H04L 65/1073* (2013.01); *H04W 8/005* (2013.01); *H04W 4/00* (2013.01); *H04W 8/24* (2013.01); *H04W 84/18* (2013.01)

(56) References Cited

U.S. PATENT DOCUMENTS

2014/0355057 A1* 12/2014 Jang ................... G06K 7/10297
  358/1.15
2017/0289277 A1* 10/2017 Lee ......................... H04L 29/08

* cited by examiner

FIG. 6

```
<?xml version="1.0" encoding="utf-8"?>
<result>
  <status>ok</status>
  <device_type>printer</device_type>
  <model_name>Printer103</model_name>
  <ip_address>192.168.0.2</ip_address>
  <mac_address>aa:bb:cc:dd:ee:ff</mac_address>
</result>
```

FIG. 7

```xml
<?xml version="1.0" encoding="utf-8"?>
<result>
   <status>ok</status>
   <device>
      <model>Printer103</model>
      <mac_address>aa:bb:cc:dd:ee:ff</mac_address>
      <serial_number>123456</serial_number>
   </device>
   <print>
      <bw>false</bw>
      <color>true</color>
      <format>jpeg,pdf</format>
      <duplex>true</duplex>
   </print>
   <scan>
      <bw>true</bw>
      <color>true</color>
      <format>jpeg</format>
   </scan>
</result>
```

FIG. 10

| MAC ADDRESS | SEARCH PROTOCOL |
|---|---|
| aa:bb:cc:dd:ee:ff | Wi-Fi Direct |
| bb:bb:cc:dd:ee:ff | Wi-Fi Direct |
| cc:bb:cc:dd:ee:ff | Wi-Fi Direct |
| dd:bb:cc:dd:ee:ff | UDP |
| ee:bb:cc:dd:ee:ff | UDP |
| aa:bb:cc:dd:ee:ff | UDP |

INFORMATION PROCESSING APPARATUS FOR SELECTING ONE OF COMMUNICATION DEVICE CAPABLE OF COMMUNICATING IN FIRST COMMUNICATION METHOD AND COMMUNICATION DEVICE CAPABLE OF COMMUNICATING IN SECOND COMMUNICATION METHOD, CONTROL METHOD FOR CONTROLLING THE INFORMATION PROCESSING APPARATUS, AND NON-TRANSITORY COMPUTER READABLE MEDIUM STORING COMPUTER EXECUTABLE INSTRUCTIONS FOR CAUSING THE INFORMATION PROCESSING APPARATUS TO EXECUTE THE METHOD

BACKGROUND

Field

Aspects of the present invention generally relate to an information processing apparatus, a control method, and a computer readable medium.

Description of the Related Art

Information processing apparatuses (such as smartphones) capable of communicating with a communication device (such as a printer) in a communication method, for example, communications via an external access point such as a wireless LAN router, or peer-to-peer communications, for example, using Wi-Fi Direct® have been known. Such an information processing apparatus performs a process for searching for communication devices existing around the information processing apparatus so as to communicate with the communication devices. In light of the foregoing, for example, Japanese Patent Application Laid-Open No. 2014-11671 proposes an information processing apparatus that arranges the search results for the communication devices that the information processing apparatus can communicate with according to the communication method of each communication device and presents the search results to the user so as to let the user select a communication device to communicate with among the communication devices.

In order to communicate with a communication device and cause the communication device to perform a predetermined process, the information processing apparatus generally needs recognizing what function the communication device has with reference to the capability information about the capability of the communication device. In light of the foregoing, for example, an information processing apparatus that acquires the capability information about the selected communication device after showing the user communication devices to communicate with to the user and letting the user select one of them as described in Japanese Patent Application Laid-Open No. 2014-11671 is proposed. However, the process for acquiring the capability information is sometimes useless depending on the communication method of the selected communication device because the protocol for searching for a communication device varies depending on the communication method of the communication device. The information processing apparatus described above does not consider the communication method of the selected communication device when determining whether to acquire the capability information about the selected communication device. This makes it difficult to perform an appropriate process in accordance with the communication method of the selected communication device.

SUMMARY

To solve the issue(s) described above, aspects of the present invention provide an information processing apparatus, a control method, and a computer readable medium that perform an appropriate process in accordance with a communication method of a communication device when the communication device is selected as the communication device to communicate with the information processing apparatus.

An information processing apparatus according to an aspect of the present invention is configured to communicate with a communication device and includes a first search unit configured to search for a communication device communicating in a first communication method while acquiring capability information of the communication device, a second search unit configured to search for a communication device communicating in a second communication method different from the first communication method without acquiring at least some of the capability information acquired by the first search unit, a selecting unit configured to select any one of the communication devices found by the first search unit and the second search unit, and a registration unit configured to register the communication device selected by the selecting unit as a communication device to communicate with the information processing apparatus, wherein, when the communication device selected by the selecting unit communicates in the second communication method, the registration unit acquires the capability information of the communication device selected by the selecting unit after the selection, and registers the communication device selected by the selecting unit as a communication device to communicate with the information processing apparatus, and wherein when the communication device selected by the selecting unit communicates in the first communication method, the registration unit does not acquire the capability information of the communication device selected by the selecting unit after the selection, and registers the communication device selected by the selecting unit as a communication device to communicate with the information processing apparatus.

Further features of aspects of the present invention will become apparent from the following description of exemplary embodiments (with reference to the attached drawings).

BRIEF DESCRIPTION OF THE DRAWINGS

FIG. 6 is a diagram of an exemplary response result to the broadcast issued by the information processing apparatus using aspects of the present invention.

FIG. 7 is diagram of exemplary capability information about the communication device.

FIG. 10 is a diagram of exemplary stored information about the printers found by the information processing apparatus using aspects of the present invention.

DESCRIPTION OF THE EMBODIMENTS

Exemplary embodiments of the present invention will be described as examples hereinafter with reference to the appended drawings. However, it should be understood that, even if the exemplary embodiments described below are properly changed or modified based on the knowledge of a person with an ordinary skill in the art without departing from the scope of the aspects of the present invention, the exemplary embodiments are also included in the scope of the aspects of the present invention.

First Embodiment

An information processing apparatus using aspects of the present invention will be described first. In the present embodiment, a smartphone will be described as an example of the information processing apparatus. Note that not only the smartphone but also various things, for example, a mobile terminal, a personal computer (hereinafter, referred to as PC), a tablet terminal, a Personal Digital Assistant (PDA), or a digital camera can be used as the information processing apparatus. An inkjet type printer that can communicate with the information processing apparatus will be described as an example of the communication device that the information processing apparatus using aspects of the present invention searches for. Note that an image processing apparatus other than the inkjet type printer, a PC, a mobile terminal, a smartphone, a tablet terminal, a PDA, a digital camera, a television, or a scanner can alternatively be used as the communication device. The image processing apparatus other than the inkjet type printer is, for example, a full-color laser beam printer, a black-and-white printer, a copy machine, or a facsimile device. Furthermore, the alternatives can be a multifunction device or a single-function device.

Figure 1:
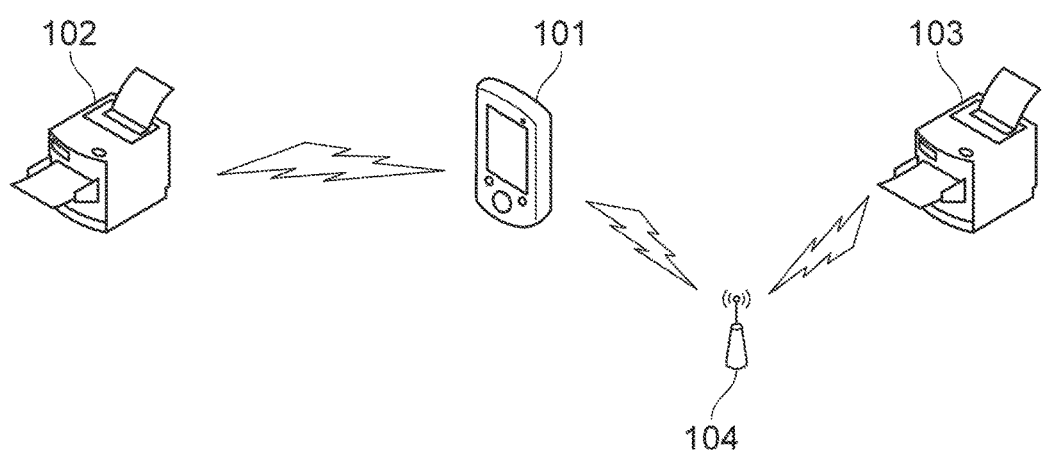
FIG. 1 is a schematic view of an information processing system.

FIG. 1 is a schematic view of an information processing system of the present embodiment. A smartphone 101 is the information processing apparatus of the present embodiment. Printers 102 and 103 are communication devices of the present embodiment. An access point 104 is an external access point separate both the information processing apparatus and the communication devices. The information processing apparatus can communicate with the communication device connected to the external access point or the Internet by the communication via the external access point. In the present embodiment, the printer 102 can directly communicate with the smartphone 101 using a peer-to-peer network, and performs wireless communications using Wireless Fidelity (Wi-Fi) Direct®. The printer 103 can communicate with the smartphone 101 via the access point 104, and performs communications in IEEE 802.11.

Figure 2:
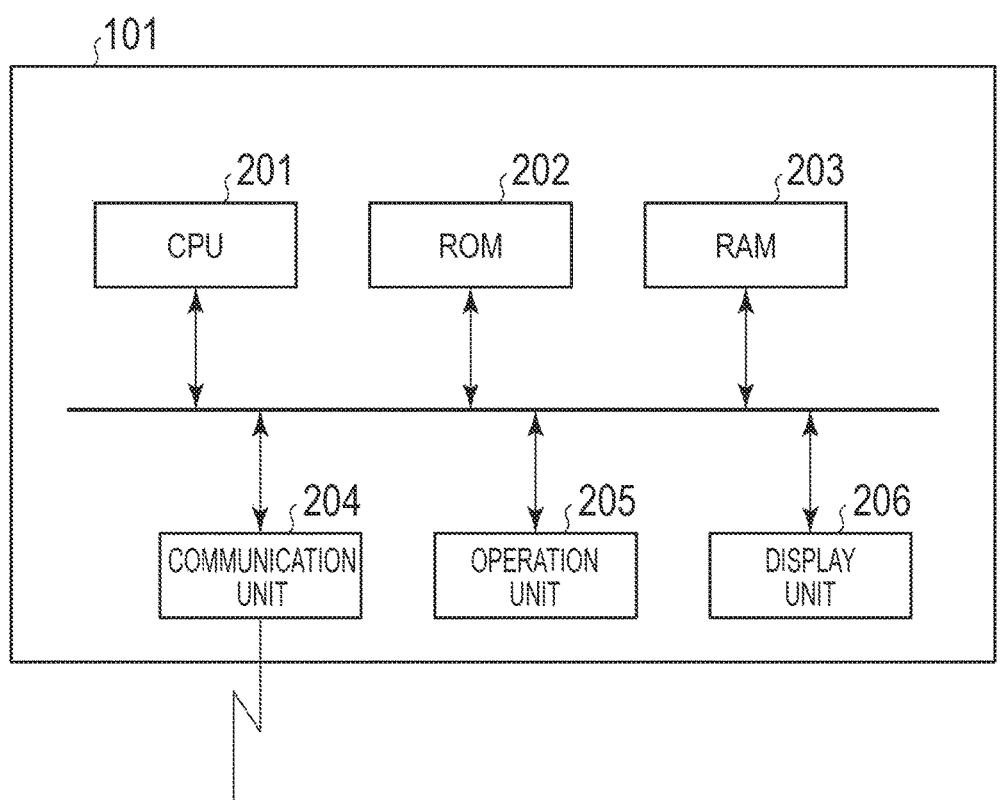
FIG. 2 is a block diagram of the schematic configuration of an information processing apparatus using aspects of the present invention.

FIG. 2 is a diagram of the schematic configuration of the smartphone 101.

The CPU 201 is a central processing unit that controls the whole smartphone 101, and generally controls the sequence of processes that the smartphone 101 performs.

ROM 202 stores fixed data including, for example, the control programs that the CPU 201 executes, a data table, and an embedded operating system (hereinafter, referred to as OS) program. In the present embodiment, each control program stored in the ROM 202 performs the software-implemented control, such as scheduling, task switching, or interrupting under the management by the embedded OS stored in the ROM 202.

RAM 203 includes, for example, Dynamic Random Access Memory (DRAM) requiring a back-up electric power source, and stores a program control variable, and the data, for example, of the service information, capability information, and identification information about the printers. A memory area in which the setting information about the smartphone 101 or the management data of the smartphone 101 are stored is also provided in the RAM 203.

The communication unit 204 is connected to a device such as the printers 102 or 103 so as to communicate the devices. The connection interface for the connection is, for example, a Universal Serial Bus (USB), or a Local Area Network (LAN). However, the connection interface is not limited to the example. Note that the communication unit 204 can directly communicate with the device in wireless communications, or can communicate with the device via the external access point installed on the network. The communication standard can be, for example, Wi-Fi®, Wi-Fi Direct®, Bluetooth®, or Near Field Communication (NFC; ISO/IEC IS 18092).

The operation unit 205 includes keys including a numeral input key, a mode setting key, a determination key, a cancellation key, and a power key so as to receive the button operation to the key or the user's input with the touch panel. The display unit 206 includes a display such as a Liquid Crystal Display (LCD) so as to display the image or text data corresponding to the details of processing performed by the smartphone 101. Note that a component can be configured to function as the operation unit 205 and the display unit 206 by displaying the information and receiving the operation.

Note that a memory such as an external HDD or an SD card can be attached to the smartphone 101 so that the information to be stored in the smartphone 101 can be stored in the memory.

Figure 3:
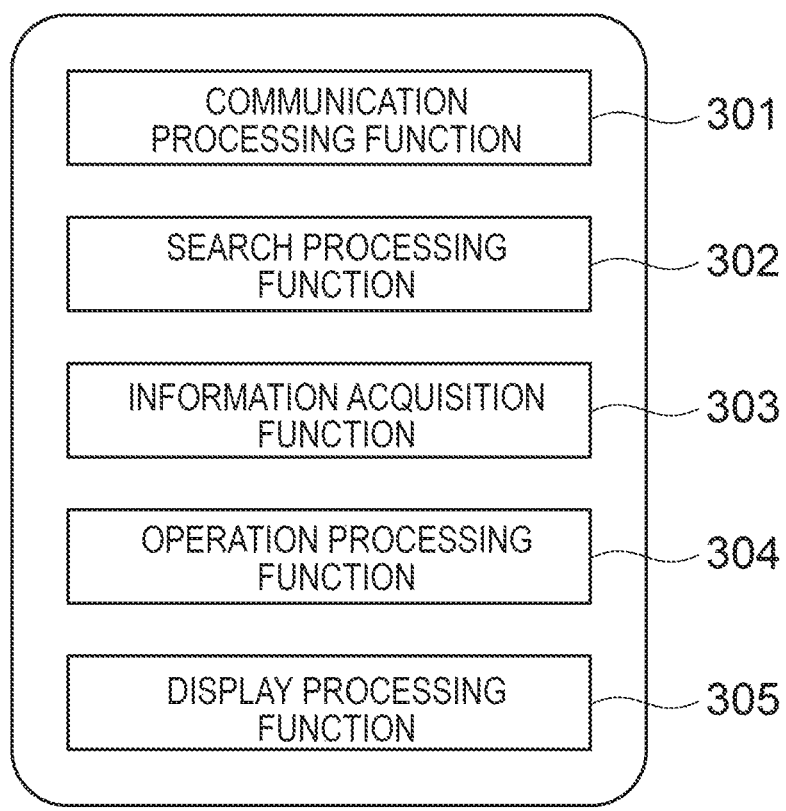
FIG. 3 is a block diagram of functions that the information processing apparatus using aspects of the present invention performs.

FIG. 3 illustrates the functions that the smartphone 101 performs. Note that the program corresponding to each function is stored in the ROM 202 or an HDD (not illustrated) attached to the smartphone 101. The CPU 201 loads the program onto the RAM 203 and executes the program. This execution implements each function. The programs include the OS, and the applications installed on the ROM 202 or the HDD.

The communication processing function 301 is configured to implement the communication with a device such as the printer 102 or 103 via the communication unit 204, using an IP address.

The search processing function 302 is configured to search for a printer that the communication processing function 301 can communicate with in accordance with the search protocol defined between the smartphone 101 and the printer that the smartphone 101 can communicate with. As a specific example of the search protocol, a standard protocol such as Universal Plug and Play (UPnP) or a protocol for performing the service discovery based on the Wi-Fi Direct® can be cited. Additionally, transmitting predetermined text data between the smartphone 101 and the printer that the smartphone 101 can communicate with in a communication protocol such as User Datagram Protocol (UDP) can search for the printer. As the text data used for the search, Extensible Markup Language (XML) based text or JavaScript (a registered trademark) Object Notation (JSON) based text can be cited. When the search processing function 302 is used to search for the printer, the smartphone 101 stores the information acquired when the printer is found in the search while associating the acquired information with the found printer. Specifically, the smartphone 101 stores the identification information uniquely set on each printer, such as a MAC address or serial number illustrated in FIG. 10, for example, in the RAM 203 while associating the identification information with the information about the search protocol used for the search, such as the name of the search protocol. Note that, when the information uniquely set on the printer is stored, not only the search protocol information but also the service information or capability information to be described below can be associated with the set information.

The search processing function 302 is also configured to determine the search protocol used for the search for the printer among the search protocols that the smartphone 101 can use. When using the determination function, the smartphone 101 refers to the information about the search protocol stored and associated with each found printer. The search processing function 302 enables the smartphone 101 to recognize what search method each found printer is found in. The communication method of the found printer varies depending on the search method. Thus, the smartphone 101 can recognize which communication method each found printer communicates in.

A method for searching for a printer communicating using Wi-Fi Direct® will be described. The smartphone 101 searches for a printer communicating in Wi-Fi Direct® using the service discovery based on Wi-Fi Direct®. The service discovery based on Wi-Fi Direct® is a function to search for the service information provided by a device compatible with the Wi-Fi Direct® communications. Specifically, the smartphone 101 searches for a printer by issuing a broadcast requesting that the communication devices around the smartphone 101 and capable of communicating in Wi-Fi Direct® provide the service information to the communication devices and analyzing the service information provided as the response. Note that, in the service discovery, transmitting and receiving an action frame defined in IEEE 802.11u can promptly acquire the service information of a device to be searched for without setting a communication parameter, for example, an IP address. When the smartphone 101 performs the service discovery while being connected to the external access point, the connection between the smartphone 101 and the access point is maintained. The information included in the service information acquired by the service discovery includes, for example, the types of services provided by the device, such as a file transmission service, a print service, a medium reproduction service, and a screen display service, in addition to the device name and the MAC address of the device. By referring to the service information acquired in the service discovery, the smartphone 101 can search for a printer that the smartphone 101 can communicate with without acquiring the capability information about the devices. The capability information will be described below in the description of the information acquisition function 303. Note that the smartphone 101 can recognize a device including the information about the print service as the printer.

Next, a method for searching for a printer communicating by the connection via an external access point will be described. When searching for a communication device using the connection via an external access point, the smartphone 101 issues a broadcast issued in accordance with the search protocol used to search for a communication device to devices connected to the external access point. FIG. 6 illustrates an example of XML data that the communication device responds to the broadcast as the response result. The status tag indicates the response result to the inquiry and indicates that the inquiry has successfully been done in this example. The device_type tag and the model_name tag indicate the type and model name of each device, respectively. The smartphone 101 can recognize the device having the device_type tag including the information indicating that the device is a printer as a printer. Thus, this example shows that the model of the communication device is a printer, and the model name is "the printer 103". The ip_address tag indicates the IP address of the communication device. This example shows that the IP address of the communication device is 192.168.0.2. The mac_address tag indicates the MAC address of the communication device, and indicates that the MAC address is aa:bb:cc:dd:ee:ff. Note that the information described in the XML data that the communication device sends as the response result is not limited to the example, and various types of information about the communication device can be described.

The information acquisition function 303 is configured to acquire the capability information about a printer in accordance with the printer capability information acquisition protocol defined between the smartphone 101 and the printer. The capability information about a printer indicates the functions that the printer includes. Specifically, the capability information indicates whether the printer has a print function, whether the printer has a scan function, or whether the printer supports double side printing or color/black-and-white printing, or indicates the type of the recording material or record medium used for the printer. Note that the capability information about the printer can include the identification information about the printer, such as the MAC address or the model name. The printer capability information acquisition protocol is prescribed between the smartphone 101 and the printer in order to acquire the capability information about the printer. According to the capability information acquisition protocol, the communication protocol used to acquire the capability information or the data format of the data to be exchanged is prescribed. As a specific example of the communication protocol used to acquire the capability information, Hyper TextTransfer Protocol (HTTP), or Transmission Control Protocol (TCP) is cited. As the text data to be exchanged via such communication protocols, the XML based data or the JSON based data can be cited.

FIG. 7 illustrates exemplary XML data indicating the capability information about a printer. Similarly to FIG. 6, the status tag in the XML data indicates the response result to the inquiry. This example shows that the inquiry has successfully been done. The device tag indicates the basic information about the device. For example, the model tag indicates the model name of the device. Furthermore, the print tag and scan tag indicate the details of the contents that the print function and scan function support, respectively. Hereinafter, the print tag and the sub-elements will be described as an example. The bw tag that is a sub-element of the print tag indicates whether the printer supports black-and-white printing. This example indicates that the printer 103 does not support black-and-white printing. The color tag indicates whether the printer supports color printing. This example indicates that the printer 103 supports color printing. The format tag indicates the print data format that the device supports. This example indicates that the printer 103 supports JPEG printing and PDF printing. The duplex tag indicates whether the printer supports double side printing. This example indicates that the printer 103 supports double side printing. Note that the XML data indicating the capability information about a printer can describe a tag indicating another type of information, for example, the information about the type of recording material or record medium that the printer is compatible with.

The smartphone 101 comprehensively determines the information in the tags using the search processing function 302 so as to determine whether the device providing the capability information is the communication device including the capability appropriate to the smartphone 101. For example, when acquiring the capability information includes a predetermined type of capability information indicating that the communication device is compatible with the model of the smartphone 101 or a predetermined application in the smartphone 101, the smartphone 101 determines that the device includes the capability appropriate to the smartphone 101. Thus, for example, when the type of a communication device is a printer but the communication device does not support the function provided by the smartphone 101, the communication device is sometimes excluded from the search results. Note that, in addition to the determination, the acquired capability information is used to display the function that the communication device can perform or the print setting. Note that the predetermined application includes the functions illustrated in FIG. 3, for example, for searching for a printer that the smartphone 101 can communicate with, and for configuring the settings of the printer connected to the smartphone 101. The predetermined application is an application for supporting the communication between the smartphone 101 and the printer. An application including the functions described above is hereinafter referred to as a print application.

The operation processing function 304 is configured to perform a process in response to the operation to the operation unit 205.

The display processing function 305 is configured to perform a process for outputting an image to be displayed on the display unit 206.

Figure 4:
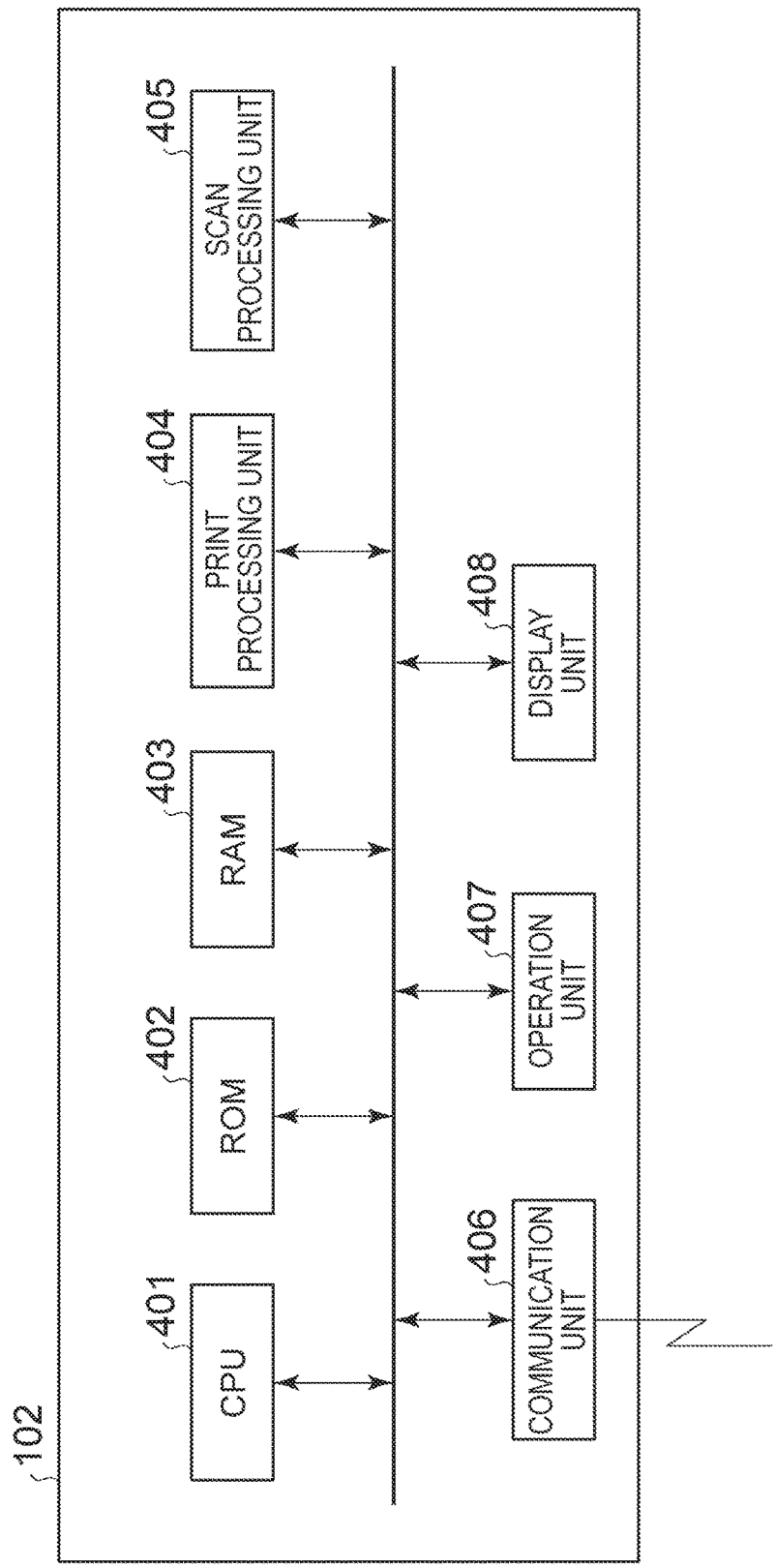
FIG. 4 is a block diagram of the schematic configuration of a communication device.

FIG. 4 is a diagram of the schematic configuration of the printer 102.

The CPU 401 is a central processing unit that controls the whole printer 102. The CPU 401 performs the communications via the communication unit 406 in accordance with the search protocol or the capability information acquisition protocol, a process in response to the operation to the operation unit 407, or a process for outputting an image to be displayed to the display unit 408.

ROM 402 stores fixed data, for example, including a control program that the CPU 401 performs, a data table, and an embedded OS program. Furthermore, various programs and fixed data, for example, for the communications, printing and scanning are also stored in the ROM 402. In the present embodiment, each control program stored in the ROM 202 is used for the software-implemented control such as scheduling, task switching, or interrupting under the management by the embedded OS stored in the ROM 402.

RAM 403 includes, for example, SRAM requiring a back-up electric power source. Note that the RAM 403 stores the data using a primary battery for data backup (not illustrated), and thus can store the important data such as a program control variable without volatilizing the data. A memory area for storing, for example, the setting information about the printer 102 or the management data of the printer 102 is also provided in the RAM 403.

The print processing unit 404 includes an inkjet type print device so as to perform the print device control and a process for printing the image data, for example, in accordance with the print job received, for example, from the smartphone 101 or the operation to the operation unit 205. Specifically, the print processing unit 404 outputs the print result by forming the image on a record medium such as paper using a recording material such as ink.

The scan processing unit 405 controls a scanner device (not illustrated) included in the printer 102 so as to perform a process for reading a document, for example, in accordance with the scanning job received, for example, from the smartphone 101 or the operation to the operation unit 205. The image data read by the scan processing unit 405 is used for the printing by the print processing unit 404 or is transmitted to another device via the communication unit 406.

The communication unit 406 is connected to and communicates with a device such as the smartphone 101. The connection interface for the connection is, for example, a USB or a LAN. However, the connection interface is not limited to the example. Note that the communication unit 406 can directly communicate with the device in wireless communications or can communicate with the device via an external access point installed on a network. The communication standard can be, for example, Wi-Fi®, Wi-Fi Direct®, Bluetooth®, or NFC.

The operation unit 407 includes a numeral input key, a mode setting key, a determination key, a cancellation key, and a power key so as to receive the button operation to the key or the user's input with the touch panel. The display unit 408 includes a display such as an LCD so as to display the information corresponding to the details of processing performed by the printer 102, the information about the state of the printer 102, or the screen for configuring the settings of the printer 102. Note that a component can be configured to function as the operation unit 407 and the display unit 408 by displaying the information and receiving the operation.

Note that the printer 103 includes a schematic configuration similar to the schematic configuration of the printer 102.

In the present embodiment, an example in which the smartphone 101 controls the process after receiving the user's selection in response to the user's selection among the search results for printers in the information processing system of FIG. 1 will be described.

Figure 5:
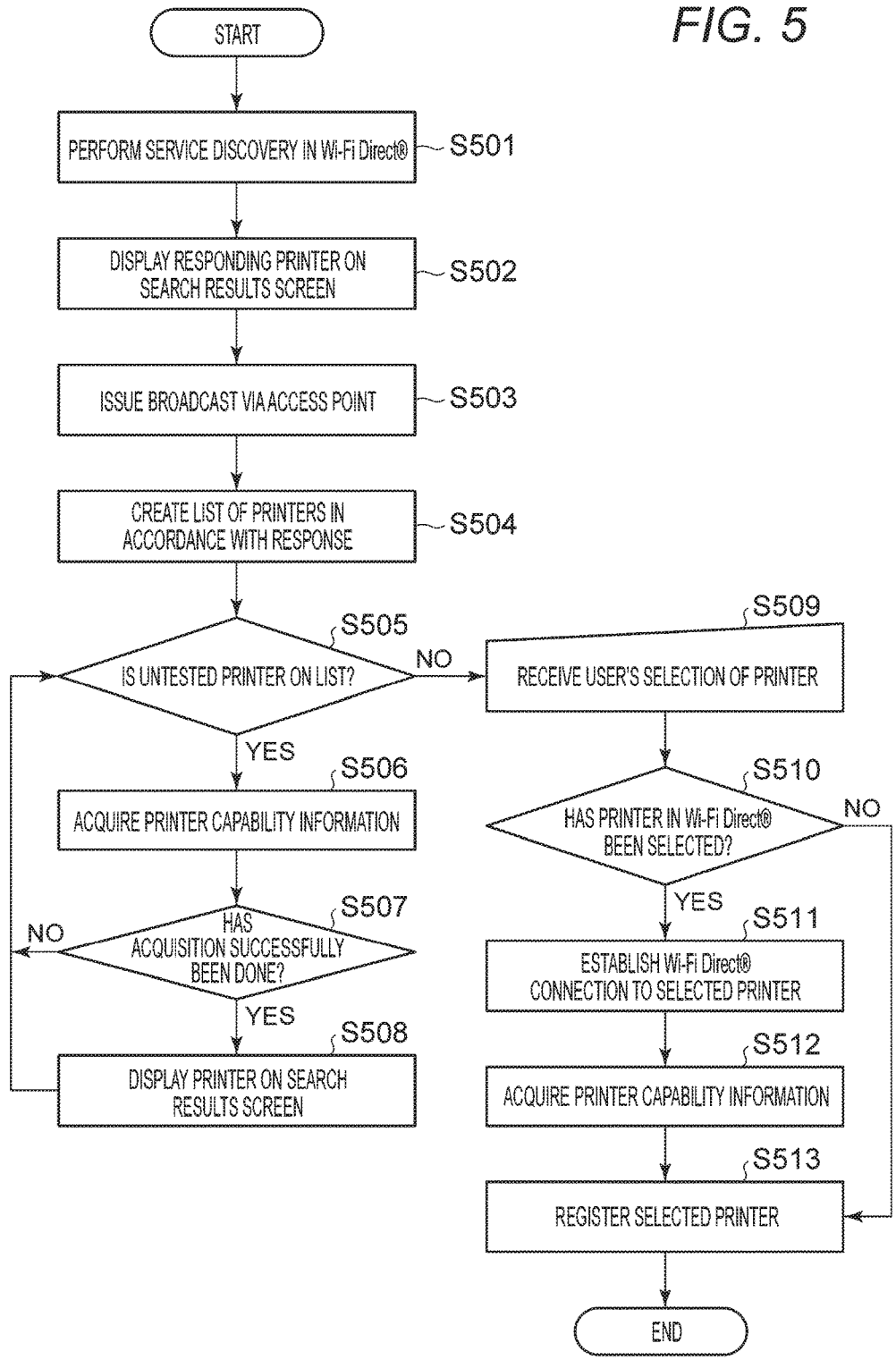
FIG. 5 is a flowchart of a process that the information processing apparatus using aspects of the present invention performs.

FIG. 5 is a flowchart of a process that the smartphone 101 performs in the present embodiment. Note that the process of the flowchart is implemented by the execution of a control program. The control program is stored in the ROM 202 or the HDD (not illustrated) included in the smartphone 101, and loaded and executed on the RAM 203 by that the CPU 201. The process of the flowchart is performed when the print application installed on the HDD or the like included in the smartphone 101 starts and the user gives an instruction for searching for a communication device to the smartphone 101 via the application.

First, the CPU 201 searches, using the search processing function 302, for a printer communicating with the smartphone 101 in the peer-to-peer communication method. In the search, the CPU 201 according to the present embodiment performs a first search step (S501 and S502) for searching for a printer communicating with the smartphone 101 in the Wi-Fi Direct® communication method.

In S501, the CPU 201 searches, using the communication processing function 301, for a printer communicating in Wi-Fi Direct®. Specifically, the CPU 201 first performs the service discovery based on the Wi-Fi Direct®. The service discovery is performed with the method described above. Note that, in the present embodiment, only the printer 102 responds to the service discovery. After that, when receiving the service information as the response to the service discovery from the printer 102, the CPU 201 checks the type of the service included in the acquired service information so as to determine whether the printer 102 includes the information about the print service. When the CPU 201 can determine that the printer 102 includes the information about the print service, the CPU 201 stores the service information (including the identification information about the printer, such as the MAC address), for example, in the RAM 203 while associating the service information with the protocol information about the service discovery in Wi-Fi Direct®.

As described above, the CPU 201 can recognize that the found printer is found in the service discovery in Wi-Fi Direct® and communicates in the Wi-Fi Direct® communication method. Note that, when the CPU 201 does not determine that the device responding to the service discovery includes the information about the print service, the CPU 201 does not store the information. This enables the CPU 201 to present only the communication device with a specific function (for example, a print function) to the user. The service information that the CPU 201 acquires from the printer 102 in S501 does not include the capability information about the printer 102 to be described in S506. The CPU 201 acquires the capability information about the printer found in Wi-Fi Direct® in the process in S512 after the printer is determined as the printer to be used.

In S502, the CPU 201 displays the printer 102 as the search result on the display unit 206 in accordance with the information stored in S501, using the display processing function 305 so as to present the search result to the user. Specifically, the CPU 201 displays the information, for example, about the model name of the printer 102 that is the information included in the acquired service information on the display unit 206.

Subsequently, the CPU 201 searches for a printer that communicates with the smartphone 101 in the communication method via the external access point, using the search processing function 302. In this search, the CPU 201 according to the present embodiment performs a second search step (S503 to S508) for searching for a printer communicating in the communication method via the access point 104.

In S503, the CPU 201 first receives the connection information such as SSID of the access point 104, which the access point 104 broadcasts, and then connects the smartphone 101 to the access point 104, using the connection information. After that, the CPU 201 issues a broadcast requesting a response to the communication devices connected to the access point 104. In this broadcast, the data is transmitted in accordance with the search protocol defined between the smartphone 101 and the printer that the smartphone 101 can communicate with. In the present embodiment, UDP is used as a specific search protocol. At that time, the smartphone 101 broadcasts the XML data, and the printer that the smartphone 101 can communicate with sends the XML data including the information, for example, about the model name and MAC address of the printer in response to the broadcast.

In S504, the CPU 201 waits for a response to the broadcast issued in S503 for a predetermined period of time. When receiving a response, the CPU 201 analyzes the data received as the response. When it can be determined as a result of the analysis that the data received as the response is valid XML data in compliance with the search protocol and the communication device sending the response is the printer compatible with the search protocol, the CPU 201 adds the communication device sending the response to a printer list. Note that the printer list is for listing the printers found by the smartphone 101 and connected to the external access point. In the present embodiment, only the printer 103 is on the printer list.

In S505, the CPU 201 determines whether there is a printer having the capability information that the CPU 201 has not tried to acquire among the printers listed on the printer list in S504. When there are printers having the capability information that the CPU 201 has not tried to acquire, the CPU 201 performs the process in S506 for one of the printers having the capability information that the CPU 201 has not tried to acquire. When the CPU 201 tries to acquire the capability information about all of the printers, the CPU 201 performs the process in S509. In the present embodiment, only the printer 103 is on the printer list. Thus, the CPU 201 performs the processes in S506 to S508 for the printer 103, and then performs the process in S509.

In S506, the CPU 201 tries to acquire the capability information about the printer 103, using the information acquisition function 303. The acquisition of capability information is implemented by the issuance of XML data in accordance with the capability information acquisition protocol to the printer 103. Note that TCP is used as the capability information acquisition protocol in the present embodiment. After issuing the XML data, the CPU 201 waits for a response from the printer 103 for a predetermined period of time. When receiving the response, the CPU 201 analyzes the data included in the response in accordance with the XML data of the capability information acquisition protocol, using the information acquisition function 303. When acquiring the capability information, the CPU 201 stores the acquired capability information, for example, in the RAM 203 while associating the acquired capability information with the identification information, for example, about the MAC address of the printer providing the acquired capability information.

The CPU 201 completes the search for a printer connected to the access point 104 in S504. However, when an old-fashioned search protocol is used in the broadcast in S503, all the printers found in the search in S504 do not necessarily include the capability appropriate to the smartphone 101. It is preferable that the CPU 201 does not display the printers without the capability appropriate to the smartphone 101 to the user because it may be impossible for the printer without the capability appropriate to the smartphone 101 to perform a process (for example, a printing process or a scanning process) in response to the job transmitted from the smartphone 101. In light of the foregoing, in S507, the CPU 201 determines whether the printer 103 includes the capability appropriate to the smartphone 101. Specifically, the CPU 201 determines whether the CPU 201 has acquired the capability information in S506. This is because it may be impossible for some of the printers without the capability appropriate to the smartphone 101 to provide the capability information to the smartphone 101. When determining that the CPU 201 has not acquired the capability information in S506, the CPU 201 determines that the printer 103 does not include the capability appropriate to the smartphone 101 and repeats the process in S505. Note that, meanwhile, the CPU 201 rewrites the information in the printer list so that the CPU 201 can recognize that the CPU 201 has tried to acquire the capability information about the printer 103. On the other hand, when determining that the capability information has been acquired in S506, the CPU 201 determines with reference to the capability information analyzed in S506 whether there is the capability information appropriate to the smartphone 101 in the acquired capability information. For example, in this determination, the CPU 201 determines whether there is the model information corresponding to the smartphone 101 or whether there is a predetermined type of function information. When determining that there is not the capability information appropriate to the smartphone 101 in the acquired capability information, the CPU 201 determines that the printer 103 does not include the capability appropriate to the smartphone 101 and repeats the process in S505. Note that, meanwhile, the CPU 201 rewrites the information in the printer list so that the CPU 201 can recognize that the CPU 201 has tried to acquire the capability information about the printer 103. On the other hand, when determining that there is the capability information appropriate to the smartphone 101 in the acquired capability information, the CPU 201 determines that the printer 103 includes the capability appropriate to the smartphone 101. Meanwhile, the CPU 201 stores the MAC address included in the capability information, for example, in the RAM 203 while associating the MAC address with the protocol information for searching for a communication device connected to the external access point. As described above, the CPU 201 can recognize that the printer found in the search in the second search step is found in the method for searching for a communication device connected to the external access point and communicates in the communication method via the access point. After that, the CPU 201 performs the process in S508. Note that only one of the determinations in S507 can be performed, or the determinations can be performed in a different order.

In S508, the CPU 201 displays the printer 103 as the search result on the display unit 206 with reference to the capability information acquired in S506 using the display processing function 305 so as to present the search result to the user. Specifically, the CPU 201 displays the information, for example, about the model name of the printer 103 on the display unit 206. After that, the CPU 201 performs the process in S505 again. Note that the CPU 201, meanwhile, rewrites the information in the printer list so that the CPU 201 can recognize that the CPU 201 has tried to acquire the capability information about the printer 103.

By the processes in S503 to S508, the printers connected to the access point and having the capability information appropriate to the smartphone 101 are displayed on the list. The capability information about the printers found in the search with the broadcast and displayed on the list has been acquired in S506. Thus, it is unnecessary to acquire the capability information again after the printer is determined as the printer that the smartphone 101 is to communicate with.

In S509, the CPU 201 selects the printer that the smartphone 101 is to communicate with among the printers included in the search results. Specifically, the CPU 201 selects the printer that the smartphone 101 is to communicate with by receiving the user's selection of the printer via the operation unit 205. Note that, in this selection, the CPU 201 can automatically select the printer that the smartphone 101 is to communicate with in accordance with a predetermined algorithm. Alternatively, the CPU 201 can be configured to automatically select a printer as the printer that the smartphone 101 is to communicate with when only one printer is found in the search.

In S502 and S508, the printer list is displayed so that the user can select either the printer found in the search in Wi-Fi Direct® in S501 or the printer found in the search with the broadcast in S503 to S507. Thus, in S510, the CPU 201 determines whether the printer selected by the user in S509 is the printer communicating in the communication method in Wi-Fi Direct®. Specifically, in the determination, the CPU 201 performs the determination by recognizing which communication method the printer selected by the user communicates in with reference to the associated information about the MAC address and the search protocol stored in S502 and S507. When determining that the printer communicates in the communication method in Wi-Fi Direct®, the CPU 201 performs the process in S511. On the other hand, when determining that the printer does not communicate in the communication method in Wi-Fi Direct® (communicates in the communication method via the external access point), the CPU 201 terminates the process. When terminating the process, the CPU 201 can start communicating with the printer in the communication method via the external access point by connecting the smartphone 101 to the access point 104.

As described above, the printer capability information about the printers found in the second search step and displayed on the list has been acquired in S506. Thus, when the user selects the communication device that communicates in the communication method via the external access point, the information processing apparatus does not need performing the process for acquiring the capability information about the selected communication device again because the capability information has been acquired in the search for the selected communication device. The process for acquiring the capability information causes the load on the information processing apparatus. Thus, when the user selects the communication device that communicates in the communication method via the access point, the information processing apparatus according to the present embodiment does not perform the process for acquiring the capability information. This enables the information processing apparatus according to the present embodiment to reduce the load itself.

In S511, the CPU 201 establishes a Wi-Fi Direct® connection to the printer selected by the user using the connection information included in the acquired service information. Note that, when the security is set on the Wi-Fi Direct® connection to the printer selected by the user, the user needs to cancel the security. Specifically, the user cancels the security by inputting the password on the password input screen displayed on the display unit 206, or performing a process for directly cancelling the security on the selected printer. Note that, in the service discovery prescribed in Wi-Fi Direct®, the CPU 201 can acquire the service information without canceling the security.

The CPU 201 does not have the capability information about the printer selected by the user because the CPU 201 has not acquired the capability information in the first search step. Thus, in S512, the CPU 201 tries to acquire the capability information about the printer to which the connection is established in S511, using the information acquisition function 303. Note that the capability information acquisition protocol used for this trial is the same as that in S508.

In S513, the CPU 201 registers the printer selected by the user as the printer to communicate with the smartphone 101, using the acquired capability information. Specifically, the CPU 201 links, for example, the information about the name of the printer selected by the user or the capability information acquired from the selected printer, the connection information included in the service information acquired from the selected printer, and the connection information about the connection to the external access point to each other and stores the linked information, for example, in the RAM 203. After that, the CPU 201 terminates the process. Note that, in order to newly send a job such as a print job or a scan job, the CPU 201 transmits the new job to the registered printers so as to cause a printer in which the process for the transmitted job is registered to perform the job. When the CPU 201 transmits a job and the smartphone 101 is not connected to the registered printer, the CPU 201 can connect the smartphone 101 to the registered printer in the communication method of the registered printer in accordance with the stored information. When the smartphone 101 is connected to the printer in the Wi-Fi Direct® connection after the CPU 201 terminates the process, the CPU 201 can temporarily disconnect the Wi-Fi Direct® connection and connect the smartphone 101 to the printer again when the printer is actually used. Alternatively, when the user selects in S509 the printer found in the second search step, the smartphone 101 is not connected to the selected printer. Thus, the CPU 201 can connect the smartphone 101 to the printer via the access point.

As described above, the information processing apparatus according to the present embodiment does not perform the process for acquiring the capability information when the communication device communicating in the peer-to-peer communication method is found in the search. The information processing apparatus performs the process for acquiring the capability information when it is determined to use the communication device communicating in the peer-to-peer communication method. By performing the first search step, the information processing apparatus according to the present embodiment can search for some of the communication devices without performing the process for acquiring the capability information, and thus can reduce the load itself. When a communication device communicating in the peer-to-peer communication method is searched for, there may be a plurality of communication devices of which capability information is to be acquired. By performing the process for acquiring the capability information when it is determined to use the communication device communicating in the peer-to-peer communication method, the information processing apparatus according to the present embodiment can perform the process for acquiring only the capability information about the communication device determined to use. For example, when many printers are found in the search in the peer-to-peer communication method, the information processing apparatus does not need acquiring the capability information about all the printers. This can improve the search speed for a printer, and can reduce the load on the information processing apparatus. Furthermore, when the communication device communicating in the communication method via the access point is used, the information processing apparatus according to the present embodiment can reduce the load itself by not performing the process for acquiring the printer capability information about the printers communicating in the peer-to-peer communication method.

Figure 8:
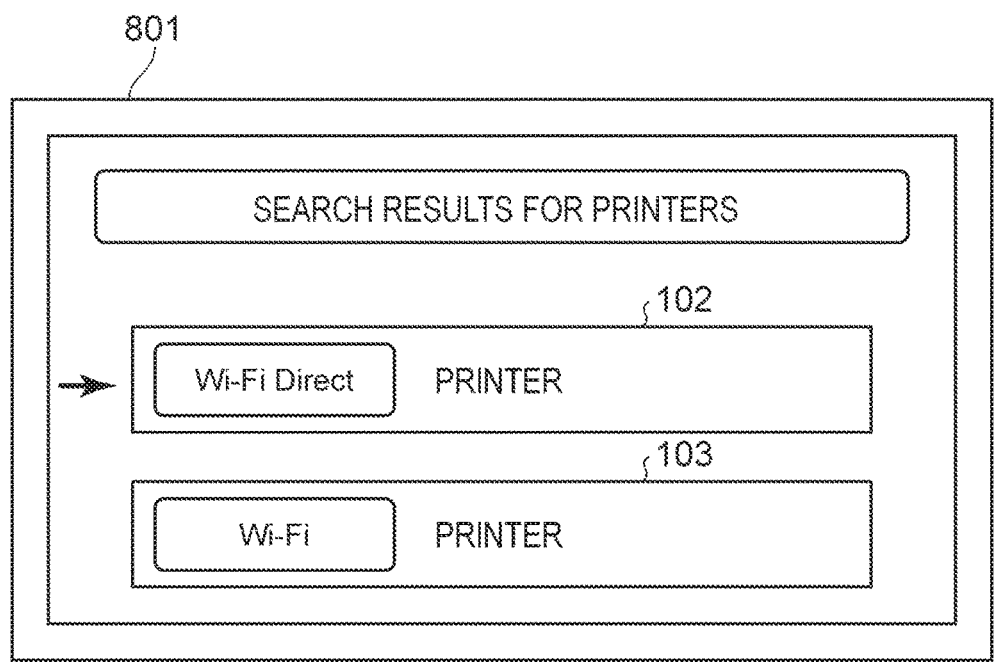
FIG. 8 is a diagram of an exemplary screen displaying the results of the search performed by the information processing apparatus using aspects of the present invention.
Figure 9:
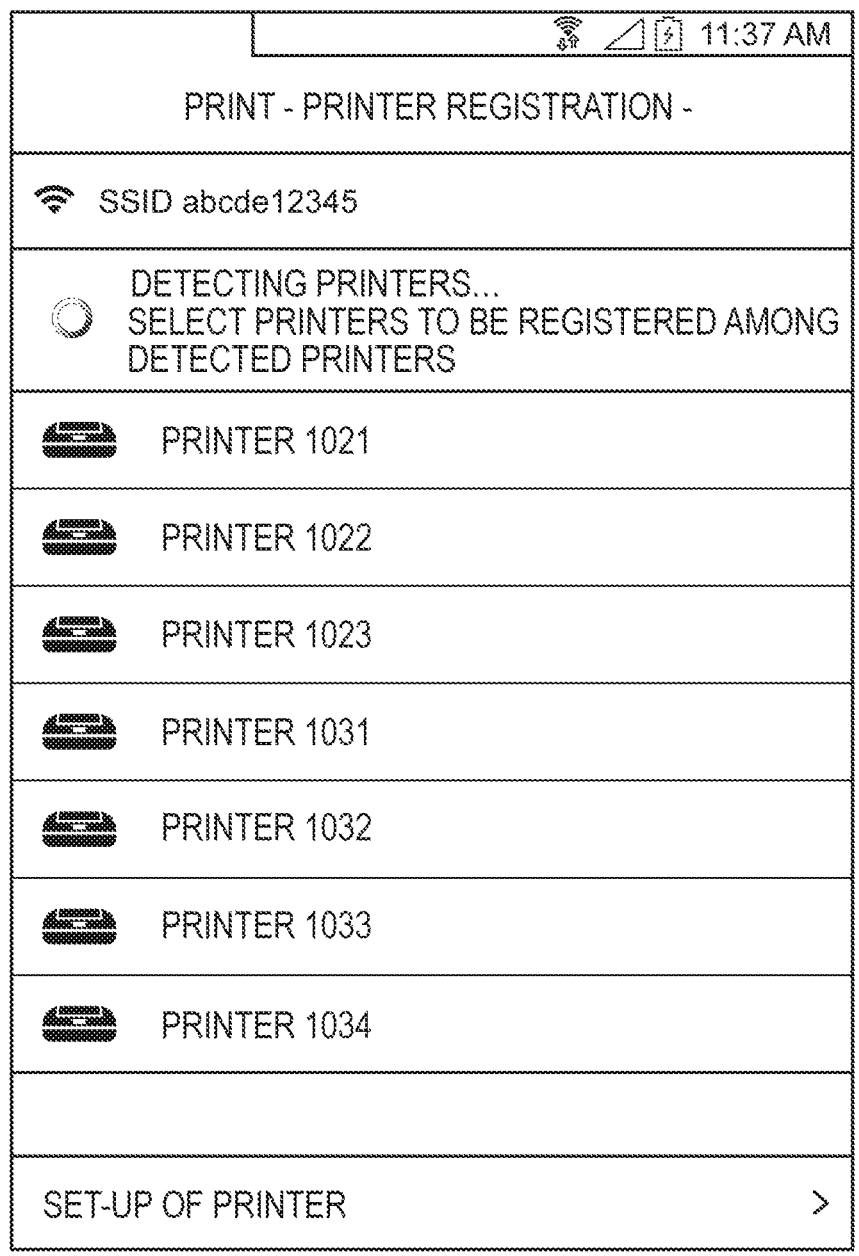
FIG. 9 is a diagram of an exemplary screen displaying the results of the search performed by the information processing apparatus using aspects of the present invention.

FIG. 8 illustrates an exemplary search results screen displaying the printers found in the first search step and the second search step. The device name of the printer found in the first search step is displayed on the first line of the search results. Specifically, the device name included in the service information that the CPU 201 acquires from the printer 102 in the service discovery in Wi-Fi Direct® is displayed. On the second line of the search results, the device name of the printer found in the second search step is displayed. Specifically, the device name included in the capability information that the CPU 201 acquires from the printer 103 is displayed. As described above, the device names are displayed so that the search step in which each printer is found can be identified. This displaying can improve the convenience for the user. The arrow in the drawing explicitly indicates the result of the user's selection. This drawing illustrates that the user selects the printer 102 in S509. Note that, when a plurality of printers are found in each search step, a plurality of printers can be displayed, for example, as illustrated in FIG. 9. In this display, the device names of the printers 1021 to 1023 found in the first search step can similarly be displayed on the upper lines while the device names of the printers 1031 to 1034 found in the second search step are displayed on the lower lines. Together with the device names of the found printers, the names of access points to be searched for can be displayed.

Note that, in the flowchart of FIG. 5, the example in which the search in Wi-Fi Direct® (the first search step) is performed before the search with the broadcast (the second search step) has been described. However, the order is not limited to the example, and the first search step and the second search step can be performed in parallel. When the first search step and the second search step are performed in parallel, the printers can be added to the printer list in the order in which the printers are found in the first search step or the second search step. However, in the order, the printers found in the first search step and the printers found in the second search step are mixed and displayed. In light of the foregoing, the printers can be separated in accordance with the search method and displayed as illustrated in FIG. 8.

As described above, the information processing apparatus according to the present embodiment can promptly search for a communication device by performing the first search step in which a communication device can be searched for without the process for acquiring the capability information.

Furthermore, the information processing apparatus according to the present embodiment can properly perform the process when the communication device to be used is selected in accordance with the communication method of the communication device.

Other Embodiments

In the first embodiment, the CPU 201 performs the first search step (S501 and S502) before the second search step (S503 to S508). However, the second search step can be performed before the first search step.

In the first embodiment, the CPU 201 displays the communication device of which capability information is successfully acquired by the CPU among the communication devices responding to the broadcast in the second search step on the search results screen. However, another method can be used. For example, the CPU 201 can issue a broadcast in accordance with the capability information acquisition protocol in S504, and receive the capability information as the response from each communication device. In this example, the CPU 201 displays the communication device of which capability information is successfully acquired in S504, using the display processing function 305, and does not perform the processes in S505 to S508.

In the first embodiment, the CPU 201 performs the first search step and the second search step, and then receives the user's selection of the communication device in S509. However, the CPU 201 can receive the user's selection of the communication device while performing either of the first search step or the second search step, or both of the steps.

In the first embodiment, the CPU 201 searches for a communication device communicating in the peer-to-peer communication method in the first search step, and for a communication device communicating in the communication method via the external access point in the second search step. The search steps are not limited to the embodiment. In other words, a communication device in each communication method can be searched for in either the first search step or the second search step. And a communication device communicating in a communication method differing from communication method described above can be searched for in either the first search step or the second search step. Only depending on whether the selected communication device is found in the search step in which the capability information is acquired, the CPU 201 needs controlling the process after the communication device is selected.

In the first embodiment, a printer is searched for as the communication device. However, the communication device to be searched for is not limited to the printer. The communication device to be searched for varies depending, for example, on the application used to search for the communication device. Thus, for example, when the user uses the application supporting the communication with a camera, the camera can be searched for. In this example, for example, the imaging service information or the imaging capability information can be determined as the service information or the capability information (S501 and S507), and a communication device having the imaging service information or the imaging capability information can be searched for.

The first embodiment can be implemented by the process in which a program used to implement one or more functions of the first embodiment is provided to the system or device via a network or a record medium and one or more processors in the computer of the system or device executes the program. Alternatively, the first embodiment can be implemented with a circuit (for example, ASIC) that implements one or more functions.

When a communication device to communicate is selected, an appropriate process in accordance with the communication method of the selected communication device can be performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-125884, filed Jun. 23, 2015, which is hereby incorporated by reference herein in its entirety.

What is claimed is:

1. An information processing apparatus capable of communicating with a communication device, the information processing apparatus comprising:
at least one processor; and
memory storing instructions that, when executed by the at least one processor, cause the information processing apparatus to operate as:
a first search unit configured to search for one or more communication devices that are connected to an access point to which the information processing apparatus is connected and are capable of communicating in a first communication method;
a second search unit configured to search for one or more communication devices that are not connected to the information processing apparatus and are capable of communicating in a second communication method different from the first communication method;
an acquisition unit configured to acquire capability information for identifying a communication device corresponding to a predetermined application that the information processing apparatus has, from the one or more communication devices found by the first search unit and the one or more communication devices found by the second search unit;
a display unit configured to display, on a display, a first area that shows information regarding the one or more communication devices found by the first search unit and a second area that shows information regarding the one or more communication devices found by the second search unit; and
an acceptance unit configured to accept, from a user via the first area or the second area, a selection operation for selecting any one of the one or more communication devices found by the first search unit and the one or more communication devices found by the second search unit,
wherein the acquisition unit acquires, before the acceptance of the selection operation, the capability information from the one or more communication devices found by the first search unit, wherein the acquisition unit acquires, after the acceptance of the selection operation, the capability information from the communication device found by the second search unit and selected by performing the selection operation, wherein the acquisition unit does not acquire the capability information from one or more communication devices found by the second search unit and not selected by performing the selection operation, and wherein, in the first area, information regarding one or more communication devices identified as a communication device corresponding to the predetermined application based on the capability information acquired from the one or more communication devices found by the first search unit is shown among the one or more communication devices found by the first search unit, and information regarding one or more communication devices not identified as a communication device corresponding to the predetermined application based on the capability information acquired from the one or more communication devices found by the first search unit is not shown among the one or more communication devices found by the first search unit.

2. The information processing apparatus according to claim 1, wherein the second communication method is a communication method in Wi-Fi Direct®.

3. The information processing apparatus according to claim 1, wherein the capability information includes at least one of information about a function that the communication device includes, information about a recording material or record medium to be used in the function of the communication device, and information about a data format of data to be used in the function of the communication device.

4. The information processing apparatus according to claim 1,
wherein the at least one processor further controls a display control unit configured to display, on the display, a search results screen showing the first area and the second area concurrently, and
wherein the display control unit displays, on the display, the search results screen such that the one or more communication devices found by the first search unit and the one or more communication devices found by the second search unit are distinguishable from each other.

5. The information processing apparatus according to claim 1,
wherein the acquisition unit acquires, before the acceptance of the selection operation, service information that is different from the capability information and is used for identifying a communication device that provides a predetermined service from the one or more communication devices found by the second search unit, and
wherein, in the second area, information regarding one or more communication devices identified as a communication device that provides the predetermined service based on the service information acquired from the one or more communication devices found by the second search unit is shown among the one or more communication devices found by the second search unit, and information regarding one or more communication devices not identified as a communication device that provides the predetermined service based on the service information acquired from the one or more communication devices found by the second search unit is not shown among the one or more communication devices found by the second search unit.

6. The information processing apparatus according to claim 5,
wherein the predetermined application is a print application, and
wherein the predetermined service is a print service.

7. The information processing apparatus according to claim 1,
wherein a protocol for searching for the one or more communication devices by the second search unit is different from a protocol for searching for the one or more communication devices by the first search unit, and
wherein a protocol for acquiring the capability information from the communication device found by the second search unit is identical to a protocol for acquiring the capability information from the one or more communication devices found by the first search unit.

8. The information processing apparatus according to claim 1,
wherein the at least one processor further controls a transmission unit configured to transmit print data to the communication device selected by performing the selection operation, and
wherein printing based on the print data is executed by the communication device that has received the print data.

9. The information processing apparatus according to claim 1,
wherein the acquisition unit acquires, before the acceptance of the selection operation, address information that is different from the capability information and relates to a predetermined address of a communication device from the one or more communication devices found by the first search unit, and
wherein the acquisition unit acquires, after the acceptance of the selection operation, the address information from the communication device found by the second search unit and selected by performing the selection operation.

10. A control method for controlling an information processing apparatus capable of communicating with a communication device, the control method comprising:
executing first search processing to search for one or more communication devices that are connected to an access point to which the information processing apparatus is connected and are capable of communicating in a first communication method;
executing second search processing to search for one or more communication devices that are not connected to the information processing apparatus and are capable of communicating in a second communication method different from the first communication method;
acquiring capability information for identifying a communication device corresponding to a predetermined application that the information processing apparatus has, from the one or more communication devices found by performing the first search processing and the one or more communication devices found by performing the second search processing;
displaying, on a display, a first area that shows information regarding the one or more communication devices found by performing the first search processing and a second area that shows information regarding the one or more communication devices found by performing the second search processing; and
accepting, from a user via the first area or the second area, a selection operation for selecting any one of the one or more communication devices found by performing the first search processing and the one or more communication devices found by performing the second search processing, wherein, before the acceptance of the selection operation, the capability information is acquired from the one or more communication devices found by performing the first search processing, wherein, after the acceptance of the selection operation, the capability information is acquired from the communication device found by performing the second search processing and selected by performing the selection operation, wherein the capability information is not acquired from one or more communication devices found by performing the second search processing and not selected by performing the selection operation, and wherein, in the first area, information regarding one or more communication devices identified as a communication device corresponding to the predetermined application based on the capability information acquired from the one or more communication devices found by performing the first search processing is shown among the one or more communication devices found by performing the first search processing, and information regarding one or more communication devices not identified as a communication device corresponding to the predetermined application based on the capability information acquired from the one or more communication devices found by performing the first search processing is not shown among the one or more communication devices found by performing the first search processing.

11. The control method according to claim 10, wherein the second communication method is a communication method in Wi-Fi Direct®.

12. The control method according to claim 10, wherein the capability information includes at least one of information about a function that the communication device includes, information about a recording material or record medium to be used in the function of the communication device, and information about a data format of data to be used in the function of the communication device.

13. The control method according to claim 10, further comprising:
displaying, on the display, a search results screen showing the first area and the second area concurrently, and
wherein the search results screen is displayed on the display such that the one or more communication devices found by performing the first search processing and the one or more communication devices found by performing the second search processing are distinguishable from each other.

14. The control method according to claim 10,
wherein, before the acceptance of the selection operation, service information that is different from the capability information and is used for identifying a communication device that provides a predetermined service is acquired from the one or more communication devices found by performing the second search processing, and
wherein, in the second area, information regarding one or more communication devices identified as a communication device that provides the predetermined service based on the service information acquired from the one or more communication devices found by performing the second search processing is shown among the one or more communication devices found by performing the second search processing, and information regarding one or more communication devices not identified as a communication device that provides the predetermined service based on the service information acquired from the one or more communication devices found by performing the second search processing is not shown among the one or more communication devices found by performing the second search processing.

15. The control method according to claim 14,
wherein the predetermined application is a print application, and
wherein the predetermined service is a print service.

16. The control method according to claim 10,
wherein a protocol for searching for the one or more communication devices by performing the second search processing is different from a protocol for searching for the one or more communication devices by performing the first search processing, and
wherein a protocol for acquiring the capability information from the communication device found by performing the second search processing is identical to a protocol for acquiring the capability information from the one or more communication devices found by performing the first search processing.

17. The control method according to claim 10, further comprising:
transmitting print data to the communication device selected by performing the selection operation,
wherein printing based on the print data is executed by the communication device that has received the print data.

18. The control method according to claim 10,
wherein, before the acceptance of the selection operation, address information that is different from the capability information and relates to a predetermined address of a communication device is acquired from the one or more communication devices found by the first search unit, and
wherein, after the acceptance of the selection operation, the address information is acquired from the communication device found by the second search unit and selected by performing the selection operation.

19. A non-transitory computer readable medium storing computer executable instructions for causing an information processing apparatus configured to communicate with a communication device to execute a control method, the control method comprising:
executing first search processing to search for one or more communication devices that are connected to an access point to which the information processing apparatus is connected and are capable of communicating in a first communication method;
executing second search processing to search for one or more communication devices that are not connected to the information processing apparatus and are capable of communicating in a second communication method different from the first communication method;
acquiring capability information for identifying a communication device corresponding to a predetermined application that the information processing apparatus has, from the one or more communication devices found by performing the first search processing and the one or more communication devices found by performing the second search processing;
displaying, on a display, a first area that shows information regarding the one or more communication devices found by performing the first search processing and a second area that shows information regarding the one or more communication devices found by performing the second search processing; and accepting, from a user via the first area or the second area, a selection operation for selecting any one of the one or more communication devices found by performing the first search processing and the one or more communication devices found by performing the second search processing, wherein, before the acceptance of the selection operation, the capability information is acquired from the one or more communication devices found by performing the first search processing, wherein, after the acceptance of the selection operation, the capability information is acquired from the communication device found by performing the second search processing and selected by performing the selection operation, wherein the capability information is not acquired from one or more communication devices found by performing the second search processing and not selected by performing the selection operation, and wherein, in the first area, information regarding one or more communication devices identified as a communication device corresponding to the predetermined application based on the capability information acquired from the one or more communication devices found by performing the first search processing is shown among the one or more communication devices found by performing the first search processing, and information regarding one or more communication devices not identified as a communication device corresponding to the predetermined application based on the capability information acquired from the one or more communication devices found by performing the first search processing is not shown among the one or more communication devices found by performing the first search processing.

* * * * *